United States Patent
Grabbe

Patent Number: 5,863,449
Date of Patent: Jan. 26, 1999

[54] METHOD FOR FORMING OPTICAL INTERFEROMETER

[75] Inventor: Dimitry G. Grabbe, Middletown, Pa.

[73] Assignee: The Whitaker Corporation, Wilmington, Del.

[21] Appl. No.: 622,319

[22] Filed: Mar. 29, 1996

[51] Int. Cl.$^6$ .......................... B29D 11/00; C23C 14/34; B05D 5/06

[52] U.S. Cl. ................. 216/24; 216/26; 216/41; 216/52; 216/53; 216/80; 216/89; 216/97; 204/192.26; 427/126.2; 427/126.3; 427/163.1; 427/163.2; 427/532; 427/534; 427/248.1; 427/255.3; 427/290

[58] Field of Search .................. 204/192.26, 192.27, 204/192.28; 216/24, 26, 41, 52, 53, 67, 80, 89, 97, 96; 427/126.2, 163.1, 163.2, 532, 534, 248.1, 290, 293, 300, 126.3, 255.3

[56] References Cited

U.S. PATENT DOCUMENTS

| | | | |
|---|---|---|---|
| 2,995,970 | 8/1961 | Hicks, Jr. et al. | 216/97 |
| 3,294,504 | 12/1966 | Hicks, Jr. | 216/41 |
| 4,358,851 | 11/1982 | Scifres et al. | 372/97 |
| 4,400,056 | 8/1983 | Cielo | 350/96.19 |
| 4,593,969 | 6/1986 | Goodman et al. | 350/96.19 |
| 4,636,031 | 1/1987 | Schmadel, Jr. et al. | 350/96.29 |
| 4,691,982 | 9/1987 | Nishimura et al. | 350/96.12 |
| 4,842,405 | 6/1989 | El-Sherif | 350/320 |
| 4,869,571 | 9/1989 | Hubner et al. | 350/96.2 |
| 5,006,133 | 11/1991 | Brienza | 359/570 |
| 5,037,180 | 8/1991 | Stone | 385/123 |
| 5,042,897 | 8/1991 | Meltz et al. | 385/37 |
| 5,048,913 | 9/1991 | Glenn et al. | 385/37 |
| 5,061,032 | 10/1991 | Meltz et al. | 385/37 |
| 5,104,209 | 4/1992 | Hill et al. | 385/27 |
| 5,157,747 | 10/1992 | Aktins et al. | 385/37 |
| 5,218,655 | 6/1993 | Mizrahi | 385/39 |
| 5,308,656 | 5/1994 | Emmons et al. | 216/41 |
| 5,309,260 | 5/1994 | Mizrahi et al. | 359/3 |
| 5,351,321 | 9/1994 | Snitzer et al. | 385/10 |
| 5,367,588 | 11/1994 | Hill et al. | 385/35 |
| 5,384,884 | 1/1995 | Kashyap et al. | 385/129 |
| 5,388,173 | 2/1995 | Glenn | 385/37 |
| 5,400,422 | 3/1995 | Askins et al. | 385/37 |

FOREIGN PATENT DOCUMENTS

| | | | |
|---|---|---|---|
| 0473140A2 | 8/1991 | European Pat. Off. | G02B 6/25 |
| 57-023902 | 2/1982 | Japan | G02B 5/14 |
| 61-159124 | 7/1986 | Japan | 427/163.2 |
| 03012608 | 2/1991 | Japan | G02B 6/10 |
| 04055801 | 2/1992 | Japan | G02B 6/10 |

Primary Examiner—Nam Nguyen
Assistant Examiner—Rodney G. McDonald
Attorney, Agent, or Firm—Salvatore Anastasi

[57] ABSTRACT

This invention relates to a method of making fiber optic interferometers. First, a plurality of optical fibers are bundled and placed into a sleeve. The bundle is then encased in the sleeve and the fiber ends are cut and polished. An area of cladding is stripped back from the polished fiber ends and layers of material are deposited on the fiber ends. These layers of material have varying indexes of refraction and form a grating. The bundle of optical fibers is then removed from encasing in the sleeve.

11 Claims, 4 Drawing Sheets

METHOD FOR FORMING OPTICAL INTERFEROMETER

FIELD OF THE INVENTION

This invention is related to the field of manufacturing wavelength separating devices, and more particularly to a method of manufacturing fiber optic interferometers.

BACKGROUND OF THE INVENTION

Optical fiber interferometers or gratings have a wide variety of applications. Some examples of such applications include wavelength separation in communication systems, strain sensing systems or computer systems. Gratings are typically produced in a fiber through laser illumination or optical writing. Optical writing comprises the steps of removing jacketing or cladding from the outer surface of a fiber core and then illuminating the fiber with a high power laser in the transverse direction and finally rejacketing the fiber for use in the desired application.

An improvement on this method is disclosed in U.S. Pat. No. 5,400,422 by Askins et al. This patent teaches a method of illuminating a fiber to achieve the desired grating and eliminates the steps of removing the jacketing, and rejacketing of the fiber optic core. This is accomplished by transversely exposing an unjacketed glass fiber to a single pulse from a pair of intersecting writing beams to create an interference pattern or grating in the fiber. This is all done as the fiber is being drawn in the manufacturing process before any jacketing is applied to the fiber, thus eliminating the need to remove the jacketing at a later stage of manufacturing in order to illuminate a grating into the fiber.

Another improvement on illumination methods is disclosed in U.S. Pat. No. 5,367,588 by Hill, et al. This patent teaches an improvement on the point by point writing technique by using a slit-mask for printing gratings in optical fibers and planar optical waveguides. The method comprises disposing a silicon glass phase grating mask adjacent and parallel to a photo sensitive optical medium such as a fiber and applying collimated light through the mask to the medium.

These laser illumination methods of manufacturing gratings require the use of precision equipment for manufacturing an accurate optical grating. In order to achieve reflection of a desired wave length over a narrow bandwidth, the grating must consist of sections of the fiber having varying indexes of refraction over a very short length of the optical fiber. Since illuminating the fiber in selected areas will change the index of refraction in the illuminated area, it is necessary to precisely illuminate only the desired area of the fiber. The illumination processes, however, are not precisely controllable and some of these methods require superimposition of laser shots on the fiber in order to achieve the desired variations in index of refraction. Problems are created in positioning due to vibration, air currents and thermally induced dimensional changes, and pointing instabilities in the laser source. As a result of requiring such precision equipment the known methods of creating an optical interference pattern or grating in a fiber are very costly. Additionally, these processes only allow making one grating at a time since each fiber must be illuminated thus adding to the labor and production costs of the interferometers.

Gratings created by these laser illumination methods do not have sharp transitions between each section where there is a change in the index of refraction along the fiber length. Typically, there is a gradual change in index of refraction from the illuminated area to the nonilluminated area. These gradual changes result in a grating having a wider bandwidth of reflected frequencies of light. It is therefore desirable to have a method of mass producing inexpensive gratings capable of reflecting light in a very narrow bandwidth.

SUMMARY OF THE INVENTION

It is an object of this invention to develop a cost effective method of mass producing optical gratings in a fiber to form interferometers.

It is a further object of this invention to develop a method of making interferometers having very narrow bandwidths of reflective light.

The objects of the invention have been accomplished by providing a method of manufacturing fiber optic interferometers comprising the steps of encasing a bundle of optical fibers in a sleeve, cutting and polishing the ends of all of the encased fibers, etching the end of the encased bundle to remove a small volume of encasing material and fiber cladding, depositing a series of layers of materials, each having a desired index of refraction and thickness simultaneously onto the tips of the fibers, and finally removing the encasing material and the optical fibers from the sleeve.

BRIEF DESCRIPTION OF THE DRAWINGS

The invention will now be described by way of example with reference to the accompanying drawings of which.

DETAILED DESCRIPTION OF THE INVENTION

Figure 1:
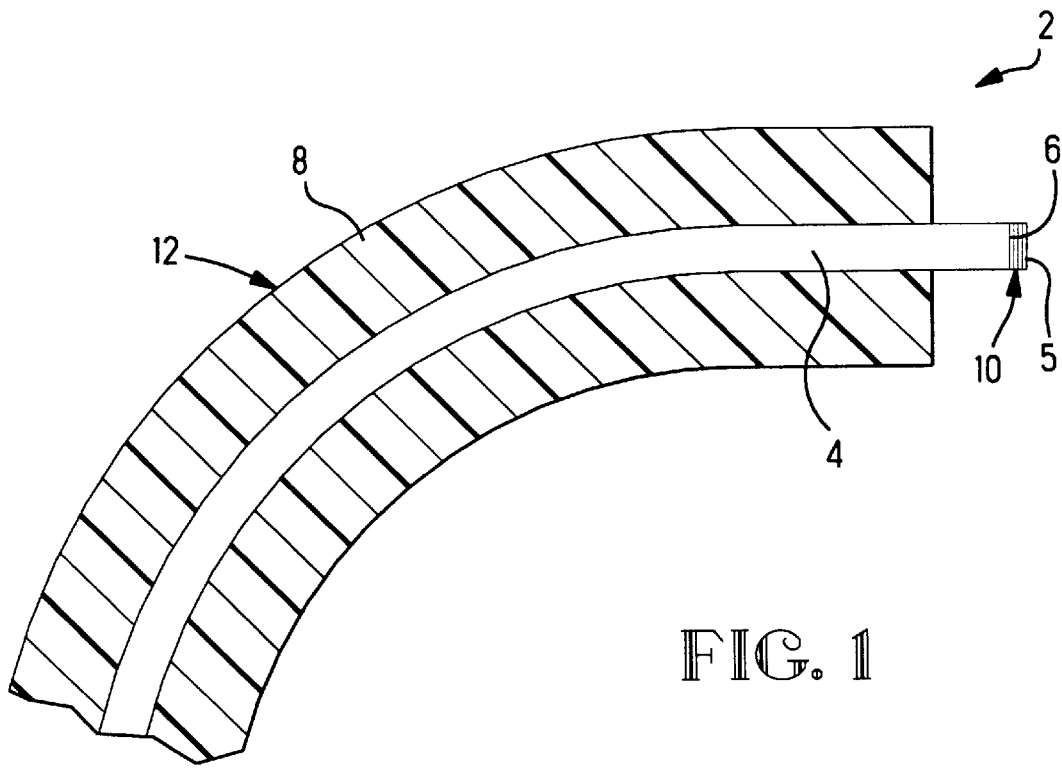
FIG. 1 shows a side view of a fiber optic interferometer.

The pigtail interferometer 2 of the present invention consists of a fiber core 4 having layers 5 of glass or oxide films deposited on its tip 6 in order to produce an interference grating which will reflect a desired frequency of light and will pass the undesired frequencies of light. As shown in FIG. 1, the pigtail interferometer 2 comprises a optical fiber 12 having its cladding 8 removed from the fiber core 4 at the tip 6. The fiber core 4 has an interferometer 10 deposited on its tip 6. The interferometer 10 consists of several layers 5 of glass and/or oxide films having differing indexes of refraction which are deposited on the tip 6 of the fiber core 4.

Figure 2:
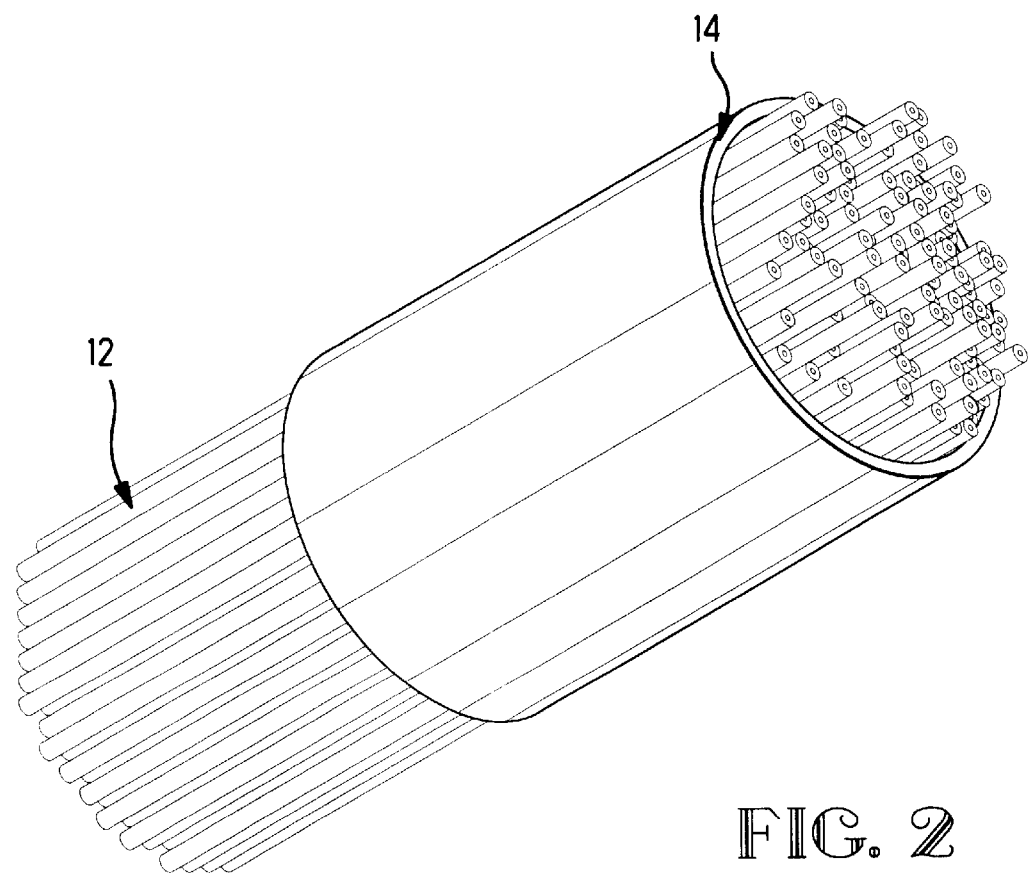
FIG. 2 shows a three dimensional view of a bundle of optical fibers inserted into a sleeve.
Figure 3:
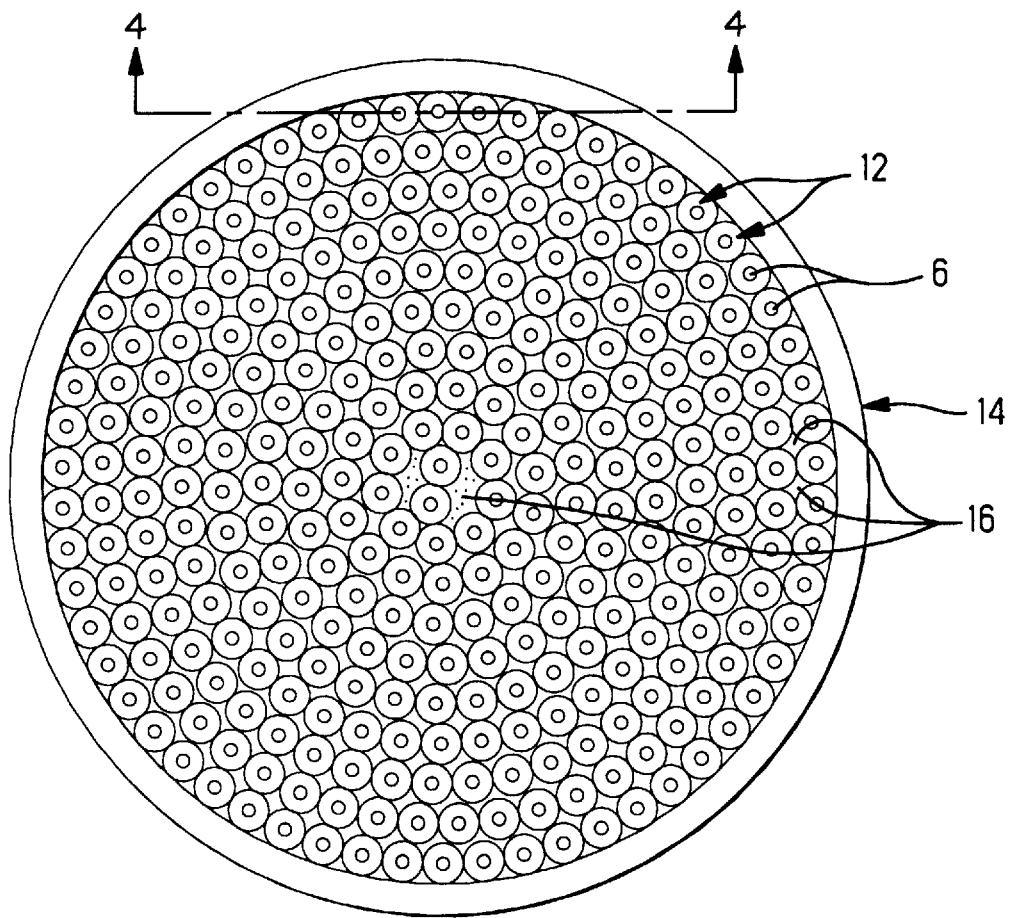
FIG. 3 shows an end view of the optical fibers in the sleeve after securing by encasing.
Figure 4:
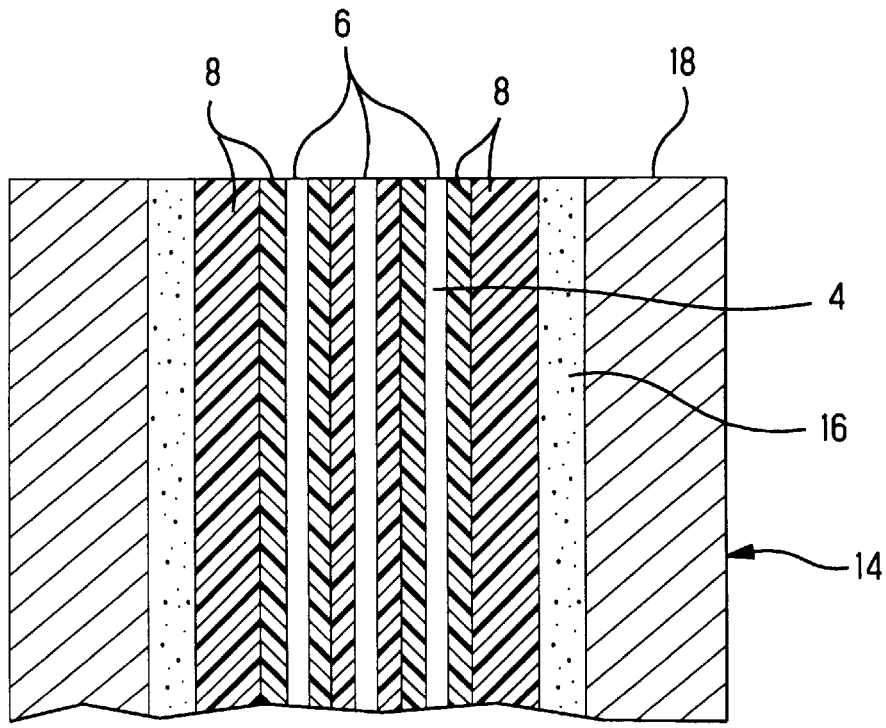
FIG. 4 shows a cross sectional view taken along the line 4,4 of FIG. 3, after polishing of the fiber ends.

A method of manufacturing the pigtail interferometer 2 of the present invention will now be described. First, as shown in FIGS. 2–3, a bundle of suitable length pieces of optical fiber 12, for example 6 or 8 inch lengths, are tightly stacked into a sleeve or pipe 14 of a diameter that is acceptable for placement into a thin film deposition chamber (not shown). As shown in FIGS. 3, the space between fibers is then filled with an encasing material 16, for example, a quick set compound, which is used for cross-sections of metallurgical specimens. Other similar compounds, for example water soluble compounds, or soft metals may also be used for encasing the optical fibers 12 inside the pipe or sleeve 14. Once the encasing material is cured, the ends, or at least one end 18 of the bundle is cut and polished in order to achieve a flat polished surface equivalent to that achieved when polishing a single fiber for placement into a fiber optic connector assembly.

Figure 5:
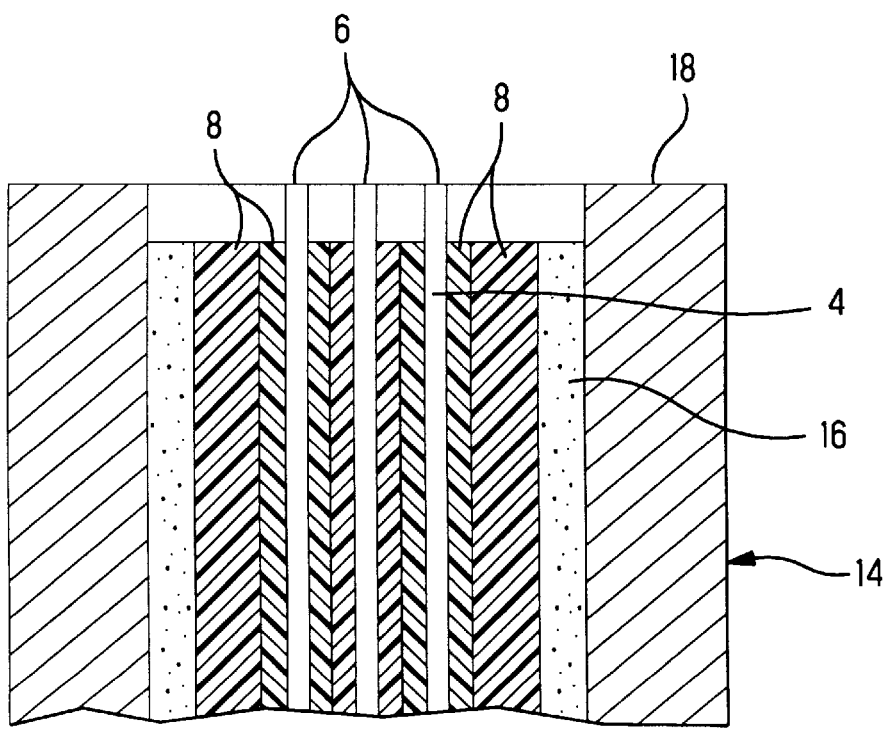
FIG. 5 shows a cross sectional view similar to FIG. 4 after encasing and removal of cladding.

The encasing material 16 and the cladding 8 around each fiber core 4 is then removed from a small length of the fiber cores 4, for example 0.004" to 0.005", at the tips 6. Depending on the type of encasing material 16 used, this removal step can be accomplished through a chemical etching process or a plasma etching process. At this stage of the process, (FIG. 5) the bundle of optical fibers 12 are polished, encased in the sleeve 14 and have the cladding 8 removed from their tips 6.

Figure 6:
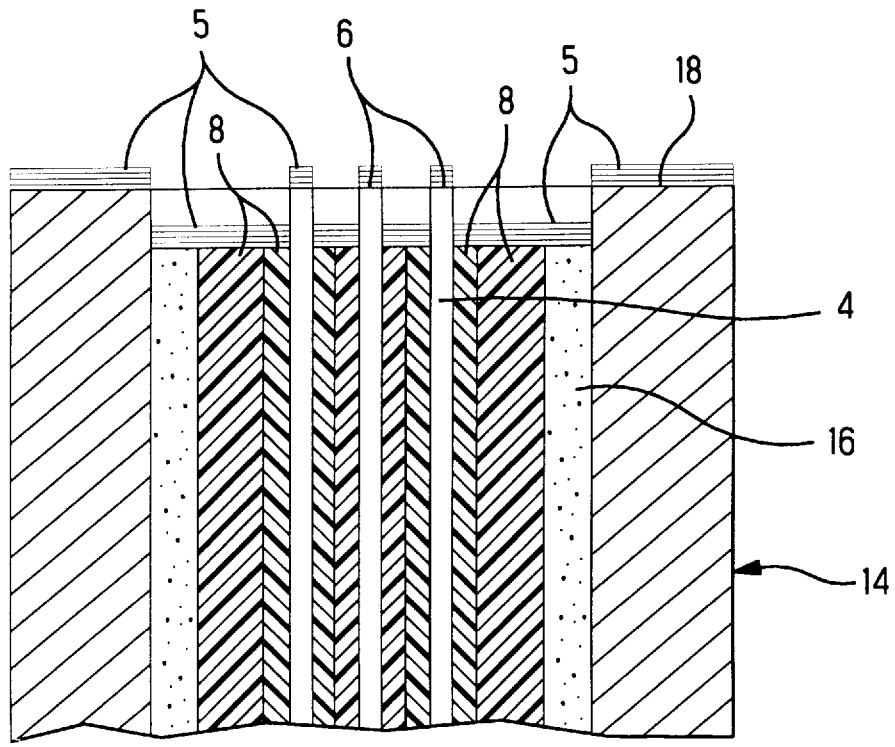
FIG. 6 shows a cross sectional view similar to that of FIG. 5 after deposition of grating layers.

The encased bundle captured in the sleeve 14 is then placed into a deposition chamber, and a number of layers 5 of glass or oxides of varying indexes of refraction are deposited onto the exposed tips 6 (FIG. 6). The deposition of the layers 5 may be accomplished by sputtering or any other acceptable deposition process suitable for the material selected for each of the layers 5, such as chemical vapor deposition or thin film deposition. The thickness and material of these layers 5 can be chosen to produce a strong reflection for a particular wavelength of interest. At this step, the deposition time is adjusted accordingly to achieve the desired thickness for each layer 5 deposited on the fiber tips 6.

Figure 7:
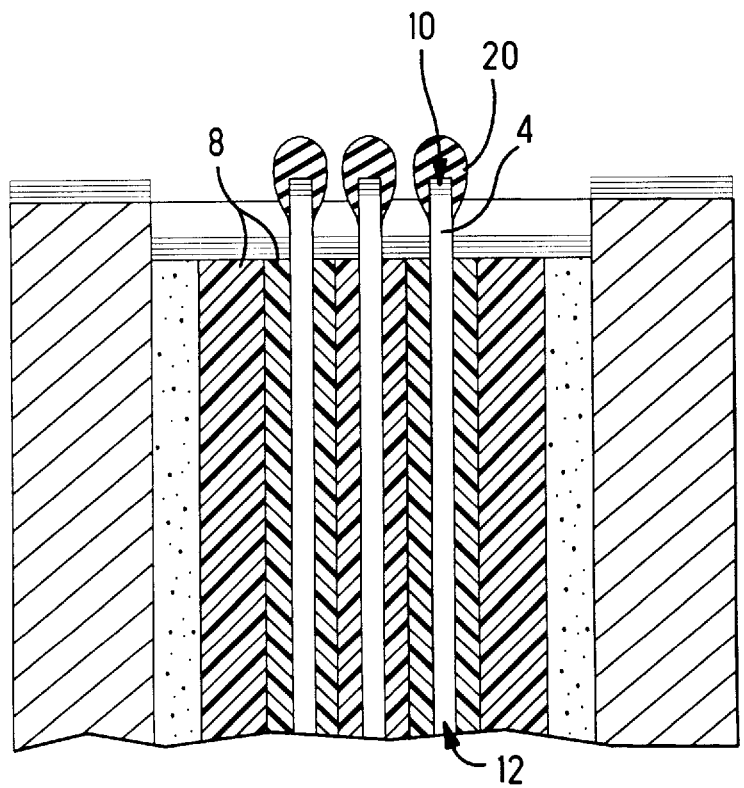
FIG. 7 shows a cross sectional view of the fiber optic interferometers after application of a protective coating.

Various means can then be employed to protect the tips 6 of each fiber by coating or encapsulating them with more compliant materials, for example, polyurethanes, vinyls, epoxies, silicone, polyamides, resins or other suitable compliant materials. As shown in FIG. 7, a protective coating 20 is then applied to each fiber core 4 by dipping, spraying or roller coating thus covering and protecting the deposited interferometer 10.

In the final step of the manufacturing process, the encasing material 16 is removed from the sleeve 14 by an appropriate method, for example, by heat, a chemical process or other fluid process depending on the solubility of the encasing material 16 that was selected. The bundle of optical fibers 12 are then removed from sleeve 14 and broken into single fibers 2 as shown in FIG. 1. The deposition step of FIG. 6, results in layers 5 of film uniformly deposited over the tips 6 of each fiber core 4 and also over the surface of the encasing material 16. Since the layers 5 are hard and fracture easily when flexed, upon removal from the encasing material 16, the layers 5 in the areas other than the fiber tip 6 will be fractured and removed.

Since this process is very accurate and repeatable using this method, in a single deposition session, many interferometers can be manufactured by this method.

In addition to being very accurate and repeatable, this process results in very sharp transitions between the layers 5 of deposited material forming the interferometer 2. The sharp transitions result in a very narrow bandwidth of reflected light from the interferometer 2.

I claim:

1. A method of making an optical interferometer comprising the steps of:

provicing a plurality of optical fibers each having a core surrounded by cladding, inserting the plurality of optical fibers into a sleeve, encasing the plurality of optical fibers in the sleeve, cutting the ends of the optical fibers, polishing tips of fibers at the optical fiber ends, stripping an area of the cladding back from the polished fiber tips, depositing a series of layers of oxide material over the polished tips, said layers having varying indexes of refraction, and removing the plurality of optical fibers from encasing in the sleeve.

2. A method of making an optical interferometer as recited in claim 1 further comprising the step of applying a protective coating over the fiber tips after having the layers of material deposited thereon.

3. A method of making an optical interferometer as recited in claim 1 wherein the optical fibers are encased in the sleeve by a metal having a lower melting point than the optical fibers.

4. A method of making an optical interferometer as recited in claim 1 wherein the optical fibers are encased in the sleeve by a water soluble encasing material.

5. A method of making an optical interferometer as recited in claim 1 wherein the optical fibers are encased in the sleeve by an encasing material which is removable by a chemical process.

6. A method of making an optical interferometer as recited in claim 1 wherein the cladding is stripped back from the polished fiber tips by an etching process.

7. A method of making an optical interferometer as recited in claim 1 wherein the layers of material are deposited onto the fiber tips by sputtering.

8. A method of making an optical interferometer as recited in claim 1 wherein the layers of material are deposited onto the fiber tips by chemical vapor deposition.

9. A method of making an optical interferometer as recited in claim 1 wherein the layers of material are deposited onto the fiber tips by thin film deposition.

10. A method of making an optical interferometer as recited in claim 3 wherein the optical fibers are removed from encasing by heating the metal.

11. A method of making an optical interferometer as recited in claim 4 or 5 wherein the optical fibers are removed from encasing by dissolving the encasing material.

* * * * *